March 24, 1959  J. H. PENNEY ET AL  2,878,911
MOTOR CLUTCH AND BRAKE MECHANISM
Filed Sept. 19, 1955
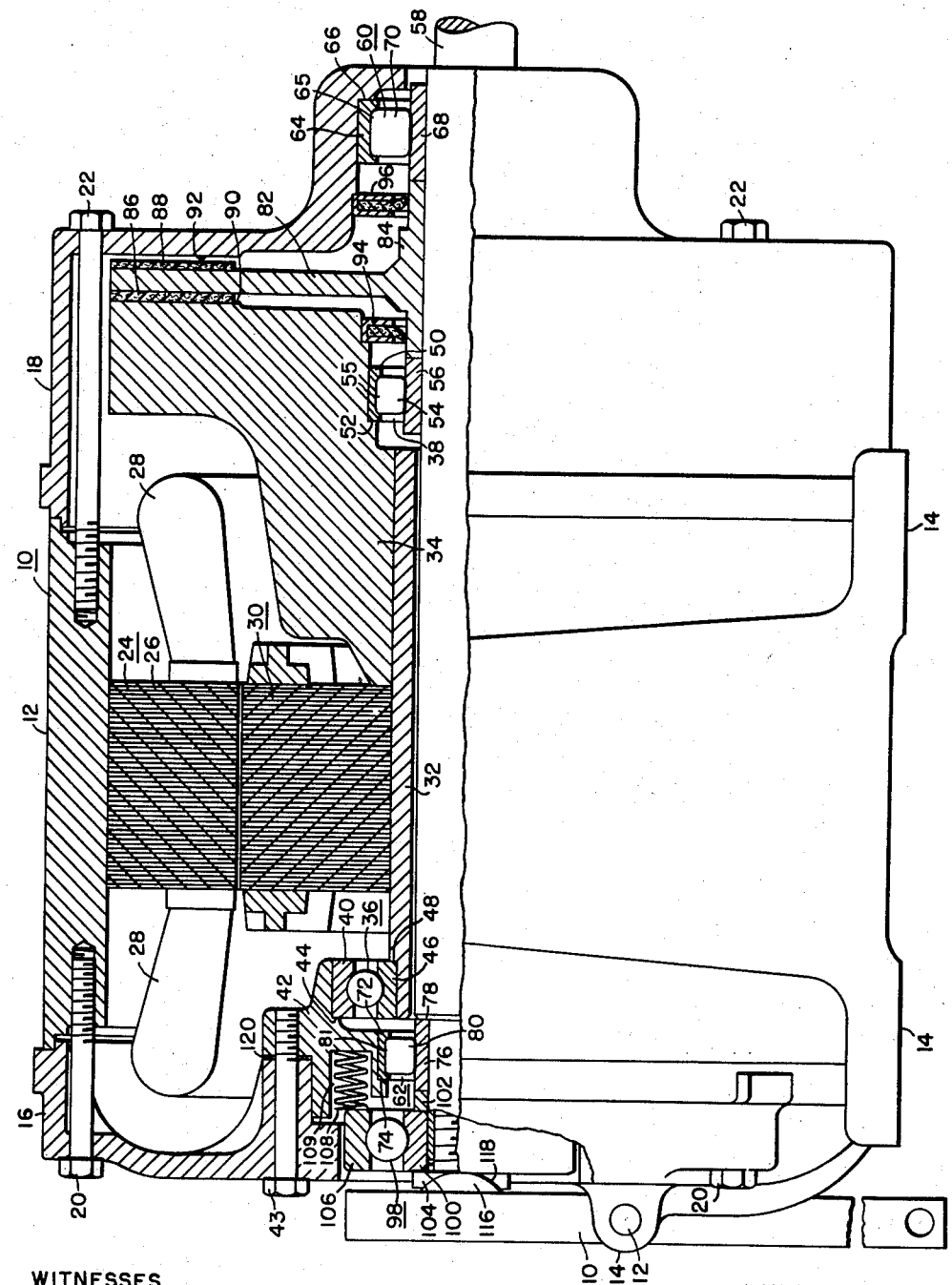
WITNESSES
INVENTORS
James H. Penney
& John B. Wren
BY
ATTORNEY

United States Patent Office 2,878,911
Patented Mar. 24, 1959

2,878,911

MOTOR CLUTCH AND BRAKE MECHANISM

James H. Penney, East Amherst, and John B. Wren, Williamsville, N.Y., assignors to Westinghouse Electric Corporation, East Pittsburgh, Pa., a corporation of Pennsylvania Application September 19, 1955, Serial No. 535,014

2 Claims. (Cl. 192—18)

This invention pertains to electric motors provided with clutch-brake mechanisms and, more particularly, to motor clutch-brake mechanisms adapted for driving looms and the like.

Electric motors with clutch and brake mechanisms are frequently used to drive looms, or other devices, which must be stopped and restarted very quickly and fairly often. In some prior designs of motors of this type, the clutch and brake are actuated by shifting the motor shaft axially. In these designs, however, it has been necessary for the bearings which support the shaft to move with the shaft, so that the entire bearing housings or bearing cartridges had to be shifted axially with the shaft, thus causing excessive wear between the bearing housings or cartridges and their supporting members, with resultant looseness of the assembly, as well as considerably increasing the mass of the axially movable elements over that of the shaft alone, reducing the speed with which the driven device could be stopped or started.

The principal object of the present invention is to provide an electric motor having a clutch and brake mechanism actuated by axial shifting of the motor shaft in which the shaft bearings remain fixed in position and the bearing races are fixed with respect to their supporting members and with respect to the shaft, so that wear is substantially eliminated and the axially movable mass is kept to a minimum to permit very rapid stopping and starting of the driven device.

Another object of the invention is to provide an electric motor having a clutch and brake mechanism in which the braking surface is an integral part of the motor end bracket, thus obtaining very effective dissipation of heat from the braking surface and eliminating the need for providing adjustment of the braking surface for squareness with the shaft.

These and other objects and advantages of this invention will be more easily understood by those skilled in the art from the following detailed description when taken in connection with the attached drawing showing a side view, partly in section, of a motor with a clutch-brake mechanism constructed in accordance with this invention.

The motor assembly shown in the drawing consists generally of a motor frame 10 in which a stator assembly 24 is mounted. A rotor member 30 is rotatably supported in the motor frame and a clutch and brake mechanism is provided at the right-hand end of the machine. A mechanism for axially moving the motor shaft 58 to actuate the clutch and brake is provided at the left-hand end of the motor.

The motor frame 10 consists of a tubular center section 12 to which mounting feet 14 may be attached. Mounting holes (not shown) may be provided in the mounting feet 14 for attaching the motor to its support. End brackets 16 and 18, having central openings for the motor shaft 58 and the shifting mechanism, are attached to each end of the frame 12 by means of a plurality of circumferentially spaced bolts 20 and 22, respectively. Bolts 20 and 22 pass through suitable openings in the end brackets 16 and 18 and thread into openings in the frame 12. A stator core 24 comprising a stack of suitable stator laminations 26 having inwardly open slots (not shown) is mounted in the central portion of the frame 12 by any desired means, such as a press fit.

A stator winding 28 of any suitable type is placed in the inwardly opening slots of the stator laminations 26. The rotor member 30, shown as a squirrel-cage rotor, is mounted on the outer surface of a hollow quill shaft 32 by any desired means such as a press fit or the like. Also positioned on the outer surface of the quill shaft 32 is an inertia member or flywheel 34. The inertia member or flywheel 34 can be attached to the quill shaft 32 by any desired means such as a heavy press fit or a shrink fit.

The rotor assembly, consisting of the rotor 30, the quill shaft 32 and inertia member or flywheel 34, is rotatably mounted in the end bracket 16 by means of a ball bearing 36 and is supported by a roller bearing 38 at the right-hand end of the inertia member 34. The outer race 40 of the ball bearing 36 is rigidly mounted in a circular opening in a bearing housing 42 by any desired means such as a press fit or the like. The left-hand edge of the outer race 40 bears against an inwardly projecting shoulder 44 formed on the bearing housing 42. The bearing housing 42 is attached to the motor end bracket 16 by means of a plurality of circumferentially spaced bolts 43 which pass through the motor end bracket 16 and thread into the bearing housing 42. The inner race 46 of the ball bearing 36 is mounted on a relieved portion of the quill shaft 32 by any desired means such as a press fit or the like, and the right-hand edge of the race 46 bears against an outwardly projecting shoulder 48 formed on the quill shaft 32.

The outer race 50 of the roller bearing 38 is mounted in a circular recess in the inertia member 34 by any desired means such as a press fit or the like, so that the left-hand edge bears against an inwardly projecting shoulder 52 formed on the inertia member 34. The inner race 56 is mounted on the motor shaft 58 by any desired means such as a press fit or the like. The motor shaft 58 in turn is rotatably mounted in the end brackets 16 and 18 by means of roller bearings 60 and 62 as will be described later. The rotating antifriction members 54 of the roller bearing 38 are positioned between the races 50 and 56, respectively, and are retained against axial movement in any usual or suitable manner, as indicated by an annular groove 55 formed in the race 50. It will be noted that the rotor assembly is supported on the shaft 58 by the bearing 38 but is free to rotate with respect to the shaft when the clutch described hereinafter is disengaged.

The above construction provides a means whereby the rotor assembly of the motor may be rotatably mounted in the motor by means of antifriction bearings and yet allow for the axial movement of the motor shaft 58 to actuate the clutch and brake as described below. The ball bearing 36, in addition to rotatably mounting one end of the rotor assembly, also serves to axially position the rotor assembly in the motor frame 10. This is possible since both the outer race 40 and the inner race 46 of the ball bearing 36 are rigidly mounted in their respective supporting members by means of a press fit or the like, and seat against shoulders 44 and 48 respectively and are thus prevented from axially moving. The roller bearing 38 allows axial movement of the inner race 56 without axially moving the outer race 52. Thus, both the outer race 52 and the inner race 56 may be securely mounted on their supporting members by a press fit or the like and thus are prevented from moving relative to their respective supporting members. The roller antifriction members 54 of the bearing 38 are retained in position with respect to the outer race 52 and allow the inner race 56 to move axially.

The motor shaft 58 is rotatably mounted in the end brackets 16 and 18 by means of roller bearings 60 and 62 as previously mentioned. The outer race 64 of the bearing 60 is mounted in a circular recess in the motor end bracket 18 by any desired means, such as a press fit, so that the right-hand edge of the race bears against an inwardly projecting shoulder 66 formed on the motor end bracket 18. The inner race 68 of the bearing 60 is attached to the motor shaft 58 by any desired means such as a press fit or the like. The rotating antifriction rollers 70 of the bearing 60 are positioned between the outer race 64 and the inner race 68 and are prevented from axially moving by any usual means, such as a retaining ring or annular groove 65.

The outer race 72 of the bearing 62 is mounted in a circular recess in the bearing housing 42 by means of a press fit or the like, so that its left-hand edge bears against an inwardly projecting shoulder 74 formed in the bearing housing 42. The inner race 76 of the bearing 62 is mounted on the motor shaft 58 by means of a press fit or the like, so that its right-hand edge seats against a shoulder 78 formed on the shaft 58. Rotating antifriction rollers 80 of the bearing 62 are mounted between the outer race 74 and the inner race 76 and are retained against axial movement by any desired means, such as a retaining ring or annular groove 81.

Also mounted on the right-hand portion of the shaft 58 between the bearings 38 and 60 is a clutch member 82. The clutch member 82 is formed integral with a tubular center section 84 which is mounted on the shaft 58 between the inner races 56 and 68 of bearings 38 and 60 by means of a press fit or the like, or which might be made integral with the shaft. Attached to both surfaces of clutch member 82 adjacent its outer periphery are suitable friction discs 86 and 88. The friction discs 86 and 88 may be made of any suitable friction material such as ordinary clutch facing material. The friction surfaces 86 and 88 of the clutch member 82 bear against radially projecting flat surfaces 90 and 92 formed on the inertia member 34 and the motor end bracket 18, respectively. The radial surface 90 formed on the inertia member 34 forms the clutch surface of the mechanism and the radially projecting surface 92 formed on the motor end bracket 18 forms the braking surface of the mechanism. Grease seals 94 and 96 of any suitable type are mounted in circular openings formed in the inertia member 34 and end bracket 18, respectively. The grease seals 94 and 96 serve to prevent lubricants escaping from bearings 38 and 60 from flowing into the area surrounding the driven clutch member 82 and thus depositing on the friction facings 86 and 88 so as to reduce their effectiveness.

The above-described construction provides for rotatably mounting a motor shaft 58 in the motor so that the motor shaft 58 may be moved through its bearings in an axial direction to alternately engage the clutch or the brake of the motor clutch-brake mechanism. While the motor shaft 58 is mounted in antifriction bearings, both the inner and outer races of the bearings are securely mounted on their supporting surfaces so that they cannot move in relation to the supporting surface. Thus, there will be no wear between the bearing races and their supporting surfaces and no looseness due to wear, which would be very undesirable. In previous designs, where one race of an antifriction bearing, or a complete bearing housing or cartridge, was allowed to axially slide in its supporting member to allow a shaft to be moved in an axial direction, excessive wear occurred between the moving bearing race or cartridge and its support, resulting in looseness of the assembly and excessive radial play of the shaft, as well as reducing the life of the bearings.

The above construction also provides a relatively easily formed clutch surface 90 and brake surface 92. The clutch surface is formed on the right-hand end of the inertia member 34 by a simple machining operation while the brake surface 92 is formed on the inner surface of the motor end bracket 18 by a similar machining operation. Thus the inertia member 34 serves not only as a flywheel but also as a rotating clutch member. The provision of the braking surface as an integral part of the end bracket provides for very effective dissipation of heat from the braking surface. This construction also has the advantage of eliminating any necessity for providing an adjusting means for adjusting the braking surface to be accurately square with the shaft axis. The radial braking surface can be very accurately machined on the bracket and no adjusting means are needed. Thus, a simple and inexpensive construction is provided.

A shifting mechanism is provided at the left-hand end of the motor to axially shift the motor shaft 58 and thus shift the clutch member 82 to alternately engage the clutch or the brake. The shifting mechanism consists of a ball bearing 98 which is securely attached to the left-hand end of the motor shaft 58, and a shifting lever 110 which is used to move the shaft 58 by applying an axial force to the outer race 106 of the ball bearing 98. The inner race 100 of the ball bearing 98 is securely attached to the shaft 58 by means of a cap screw 104 which threads into the end of the shaft 58 and serves to lock the inner race 100 securely in place against the inner race of the bearing 62, a spacer 102 being used if necessary.

The outer race 106 of the bearing 98 is forced to the left by means of a plurality of circumferentially spaced compression springs 108. The compression springs 108 are mounted in a plurality of circumferentially spaced holes 109 formed in the bearing housing 42 previously described. The shifting lever 110 is pivotally mounted by means of a pin 112, the ends of which are supported in suitable projecting ears 114 formed on the motor end bracket 16. A pair of diametrically opposed projections 116 are provided at the upper end of the shifting lever 110. Each of the projections 116 has a circular outer surface 118 which bears against the outer race 106 of the bearing 98 when the lever 110 is moved to operate the brake.

In order to adjust the axial clearance between the clutch and brake surfaces of the motor clutch mechanism, ring-shaped shim members 120 are inserted between the mating surfaces of the bearing housing 42 and the motor end bracket 16. Thus the axial clearance can be accurately adjusted as the friction surfaces 86 and 88 wear to utilize the complete thickness of the friction surfaces 86 and 88. Once adjusted, axial clearance between the clutch and brake cannot change until the bolts 43 are removed and additional shims 120 placed between the mating surfaces of the motor end bracket 16 and the bearing mounting bracket 42. This provides a relatively simple and inexpensive method for adjusting the axial clearance which at the same time is very reliable.

In order to operate the clutch brake mechanism of this invention, the lower end of the shifting lever 110 is moved to the left. This movement of the shifting lever 110 engages the projections 116 with the bearing race 106 and moves the ball bearing 98 to the right, thus moving the motor shaft 58 axially to the right through the roller bearings 38, 60 and 62. This movement of the motor shaft 58 disengages the clutch element 82 from the clutch surface 90 and engages it with the braking surface 92, thus stopping the rotation of the motor shaft 58 and its connected loom or other driven mechanism. The movement of the shifting arm 110 is transmitted through the outer race 106 of the bearing 98 to the inner race 100 and thus to the motor shaft 58. The above motor clutch mechanism is arranged so that the driven clutch element 82 is normally engaged with the clutch surface 90, thus driving the connected loom or other mechanism. It will be apparent, however, that the arrangement could easily be modified so that the clutch element 82 is normally in engagement with the braking surface 92 and would have to be moved to the left to engage the clutch member 82 with the clutch surface 90.

It should now be apparent that a clutch-brake mechanism for electric motors has been provided which has many advantages. Thus, in shifting the shaft axially, the roller bearings which support the shaft remain fixed in position and the shaft moves through the bearings with little wear. This is because both the shaft and the bearing rollers are rotating at relatively high speed and there is very little sliding friction between the rollers and the inner races when the shaft is moved axially for the short distance required. There is therefore only negligible wear due to the movement of the shaft and substantially no wear between the bearing races and their supporting elements, so that one of the major difficulties of conventional designs has been eliminated. Since only the shaft itself is moved axially, the mass of the moving elements is reduced to a minimum and very rapid operation is possible, which is very desirable in drives for such devices as looms.

Having thus described one preferred embodiment of this invention as required by the Patent Statutes, it is desired that this invention be not limited by the described embodiment but only as required by the prior art.

We claim as our invention:

1. An electric clutch-brake motor comprising a stator frame, end brackets secured to said frame, a motor stator mounted in said stator frame, a rotor member including a hollow rotor shaft mounted for rotation within said stator, a motor shaft disposed within said hollow rotor shaft for rotation relative thereto, anti-friction bearing means for supporting said motor shaft at each end, one race of each of said bearing means being securely mounted in a corresponding one of said end brackets, the other race of each of said bearing means being securely mounted on said motor shaft, anti-friction members being retained in said one race of each of said bearing means and said other race of each of said bearing means being of greater width than said one race and being adapted for axial movement relative to said one race and said anti-friction members, a radially extending inertia member on said rotor shaft having an annular clutch surface on a face thereof, one of said end brackets having integral therewith an annular braking surface on a face thereof opposing said clutch surface, a radially extending clutch member rigidly mounted on said motor shaft having annular friction surfaces on each face thereof, said clutch member disposed intermediate said inertia member and said end bracket, said friction surfaces being intermediate said clutch surface and said braking surface on said end bracket, and means for shifting said motor shaft axially to engage the clutch element alternatively with either the clutch surface or the braking surface.

2. An electric clutch-brake motor comprising a stator frame, end brackets secured to said frame, a motor stator mounted in said stator frame, a rotor member including a hollow rotor shaft mounted for rotation within said stator, a motor shaft disposed within said hollow rotor shaft for rotation relative thereto, anti-friction bearing means for supporting said motor shaft at each end, one race of each of said bearing means being securely mounted in a corresponding one of said end brackets, the other race of each of said bearing means being securely mounted on said motor shaft, anti-friction members being retained in said one race of each of said bearing means and said other race of each of said bearing means being of greater width than said one race and being adapted for axial movement relative to said one race and said anti-friction members, a radially extending inertia member on said rotor shaft having an annular clutch surface on a face thereof, one of said end brackets having integral therewith an annular braking surface on a face thereof opposing said clutch surface, a radially extending clutch member rigidly mounted on said motor shaft having annular friction surfaces on each face thereof, said clutch member disposed intermediate said inertia member and said end bracket, said friction surfaces being intermediate said clutch surface and said braking surface on said end bracket, and means for shifting said motor shaft axially in said hollow shaft comprising a bearing, the inner race of which is rigidly attached to one end of said motor shaft, the outer race of said bearing being spring-biased to move said shaft axially to engage said clutch member with said clutch surface and means engaging the outer race of said bearing for axially moving the motor shaft in the opposite direction against said spring bias to disengage said clutch member from said clutch surface and to engage it with said braking surface.

References Cited in the file of this patent
UNITED STATES PATENTS

| | | |
|---|---|---|
| 2,269,788 | Schenk | Jan. 13, 1942 |
| 2,340,612 | Peets et al. | Feb. 1, 1944 |
| 2,721,279 | Wendel | Oct. 18, 1955 |
| 2,757,766 | McCroskey et al. | Aug. 7, 1956 |